United States Patent
Xu et al.

(10) Patent No.: US 8,073,197 B2
(45) Date of Patent: Dec. 6, 2011

(54) METHOD OF TRACKING OBJECTS IN A VIDEO SEQUENCE

(75) Inventors: Li-Qun Xu, Suffolk (GB); Pere Puig Folch, Cambridgeshire (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 1033 days.

(21) Appl. No.: 11/885,751

(22) PCT Filed: Mar. 1, 2006

(86) PCT No.: PCT/GB2006/000731
§ 371 (c)(1),
(2), (4) Date: Sep. 6, 2007

(87) PCT Pub. No.: WO2006/097680
PCT Pub. Date: Sep. 21, 2006

(65) Prior Publication Data
US 2008/0166045 A1    Jul. 10, 2008

(30) Foreign Application Priority Data
Mar. 17, 2005  (EP) .................................. 05251638

(51) Int. Cl.
*G06K 9/00*  (2006.01)
(52) U.S. Cl. .......................... 382/103; 382/154; 348/169
(58) Field of Classification Search .................. 382/224, 382/103, 154; 348/169–172
See application file for complete search history.

(56) References Cited

U.S. PATENT DOCUMENTS

| | | | |
|---|---|---|---|
| 6,526,161 B1 * | 2/2003 | Yan ................................. | 382/118 |
| 2003/0219146 A1 * | 11/2003 | Jepson et al. .................. | 382/103 |
| 2005/0012817 A1 * | 1/2005 | Hampapur et al. ........... | 348/143 |
| 2005/0286756 A1 * | 12/2005 | Hong et al. .................... | 382/154 |
| 2010/0215251 A1 * | 8/2010 | Klein Gunnewiek et al. ............................. | 382/154 |

OTHER PUBLICATIONS

Haritaoglu et al, "Detection and Tracking of Shopping Groups in Stores" 2001, CVPR 2001. Proceedings of the 2001 IEEE Computer Society Conference on Computer Vision and Pattern Recognition, vol. 2, p. I431-I-438.*

(Continued)

*Primary Examiner* — Aaron W Carter
(74) *Attorney, Agent, or Firm* — Nixon & Vanderhye P.C.

(57) ABSTRACT

A video surveillance system (10) comprises a camera (25), a personal computer (PC) (27) and a video monitor (29). Video processing software is provided on the hard disk drive of the PC (27). The software is arranged to perform a number of processing operations on video data received from the camera, the video data representing individual frames of captured video. In particular, the software is arranged to identify one or more foreground blobs in a current frame, to match the or each blob with an object identified in one or more previous frames, and to track the motion of the or each object as more frames are received. In order to maintain the identity of objects during an occlusion event, an appearance model is generated for blobs that are close to one another in terms of image position. Once occlusion takes place, the respective appearance models are used, in combination with a depth factor representing the depth order of the occluded objects, to segment the resulting group blob into regions which are classified as representing one or other of the merged objects.

11 Claims, 8 Drawing Sheets

OTHER PUBLICATIONS

Notification and International Search Report (PCT/ISA/210/220); Written Opinion (PCT/ISA/237) for PCT/GB2006/00731 dated Jun. 14, 2006.

European Search Report for EP 05251638.2 dated Sep. 13, 2005.

Senior, A., "Tracking people with probabilistic appearance models." Proc. 3$^{rd}$ IEEE Intl. Workshop on Performance Evaluation of Tracking and Surveillance (PETS 2002), Copenhagen, Denmark, p. 48-55, 2002, XP002341137.

Capellades M. B. et al., "An Appearance Based Approach for Human and Object Tracking," Proc. Intl. Conf. on Image Processing. 2003 (ICIP-2003), Barcelona Spain, ICIP, New York, NY, IEEE, U.S. vol. 2 of 3, p. 85-88, 2003, XP010669829.

Xu et al., "Segmentation and tracking of multiple moving objects for intelligent video analysis," British Telecom (BT) Technology Journal, vol. 22, No. 3, p. 140-150, Jul. 2004, XP002341136.

\* cited by examiner

Overlapping zone

METHOD OF TRACKING OBJECTS IN A VIDEO SEQUENCE

This application is the US national phase of international application PCT/GB2006/000731 filed 1 Mar. 2006 which designated the U.S. and claims benefit of EP 05251638.2, dated 17 Mar. 2005, the entire content of which is hereby incorporated by reference.

This invention relates to a method of tracking objects in a video sequence, and particularly, though not exclusively, to a method performed by digital video processing means which receives video frames from a camera, or other video source.

Digital video processing is used in a wide range of applications. For example, modern video surveillance systems commonly employ digital processing techniques to provide information concerning moving objects in the video. Such a system will typically comprise a video camera connected to a computer system via a direct or network link. The computer system runs software arranged to process and analyse video data supplied from the camera.

Figure 1:
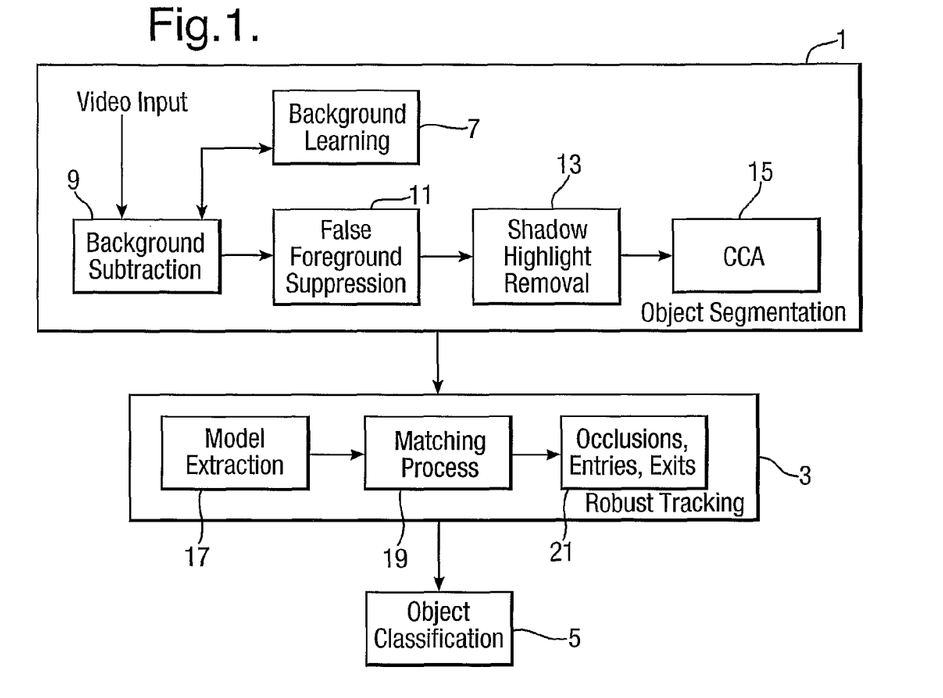
FIG. 1 is a block diagram showing functional elements of a known intelligent video system.

FIG. 1 is a block diagram showing the software-level stages of a known surveillance system. The surveillance system comprises three main blocks, namely an object segmentation block 1, a robust tracking block 3 and an object classification block 5.

In a first stage 7 of the object segmentation block 1, a background model is learned from an initial segment of video data. The background model typically comprises statistical information representing the relatively static background content. In this respect, it will be appreciated that a background scene will remain relatively stationary compared with objects in the foreground. In a second stage 9, background subtraction is performed on each incoming video frame. The current frame is compared with the background model to estimate which pixels of the current frame represent foreground regions and which represent background. Small changes in the background model are also updated. Since the foreground pixels thus obtained may suffer from false detection due to noise or camera jitter, in a third stage 11, false foreground suppression is performed. Here, for each pixel initially classified as a foreground pixel, each of its 8-connected neighbouring pixels is examined to determine if the pixel should be reclassified as a background pixel. In a fourth stage 13, further detection is applied to locate areas likely to be cast shadows or highlights. The presence of shadows and highlights can result in detected foreground regions having a distorted shape. In a fifth stage 15, connected component analysis (CCA) is performed to group all the pixels presumably belonging to individual objects into respective blobs. The blobs are transferred to the robust tracking block 3 in which a comparison is made with objects identified in previous frames to establish a correspondence therebetween.

In the robust tracking block 3, a first stage 17 involves extracting a model for each received blob, the model usually comprising a temporal template of persistent characteristic features, such as the velocity, shape and colour of the blob. In the second stage 19, a matching process is performed using the features from each received blob and the objects identified in previous frames. More specifically, a cost function is computed for each combination of blobs and objects in order to identify matches. When a match occurs, a trajectory database is updated indicating the movement of the object. If required, the information stored in the database can be used to display a trail line on a display screen showing the cumulative path taken by the object. In a third stage 21, the result of the matching process is used to identify objects that have become occluded, have just entered or have disappeared from the scene.

In the object classification block 5, objects are classified in terms of their resemblance with real-world objects, such as 'person' or 'vehicle'. Subsequent high-level applications can also be employed to perform intelligent analysis of objects based on their appearance and movement.

A detailed description of the above-described video surveillance system is given by L-Q Xu, J L Landabaso, B Lei in "Segmentation and tracking of multiple moving objects for intelligent video analysis", British Telecommunications (BT) Technology Journal, Vol. 22, No. 3, Jul. 2004.

In a realistic video scenario, the simultaneous tracking of multiple moving objects can cause a variety of problems for the system. The scene is often cluttered, the objects present are constantly moving, the lighting conditions may change, self-shadow regions may be present, and so on. Perhaps the most challenging problem confronting any automated or intelligent video system is how to deal robustly with occlusions that partially or totally block the view of an object from the camera's line of sight. Occlusions can be caused by stationary background structures, such as buildings or trees, or by other moving objects that pass or interact with the object of interest. In many cases, an occlusion event will involve both static and dynamic occlusions. As a result of occlusion, the tracking block 3 may have difficulty matching the newly-merged blob with objects already being tracked and so the identity of previously-tracked objects will be lost. This is undesirable in any automatic video system in which the user may want to obtain information on the movement or behaviour of objects being observed.

There has been some research into occlusion problems. A number of recently-proposed methods are based around the use of so-called appearance models, as opposed to temporal templates, in the matching process. The appearance models comprise a set of data representing the statistical properties of each blob's appearance. In Balcells et al in "An appearance based approach for human and object tracking", Proceedings of International Conference on Image Processing (ICIP '03), Barcelona, September 2003, the appearance model comprises a colour histogram and associated colour correlogram which together model the appearance of each blob. The correlogram represents the local spatial correlation of colours. The models are then used to match the newly-detected blobs in the incoming frame with already-tracked objects. When a dynamic occlusion, or object grouping, is detected, the individual appearance models are used to segment the group into regions that belong to the individual objects so as to maintain their tracking identities. Unfortunately, there is a high degree of complexity and computational cost involved in generating and applying the correlogram.

Furthermore, in the event of a sudden change of an object's appearance, such as if a person walks behind a desk so that only the upper part of his or her body is visible, the effectiveness of appearance-based tracking will be significantly reduced. Indeed, under such circumstances, appearance-based tracking often fails completely.

According to one aspect of the invention, there is provided a method of tracking objects in a video sequence comprising a plurality of frames, each object being defined by a plurality of pixels, the method comprising: (a) identifying, in a first frame, first and second objects; (b) providing first and second appearance models respectively representing the first and second objects; (c) identifying in a second, subsequent, frame, a group object resulting from the merging of the first and second objects; (d) classifying each pixel of the group object as representing either the first or second object, the classification comprising (i) calculating first and second likelihood parameters respectively indicating the correspondence between said pixel's appearance and the first and second appearance models, (ii) applying a first and second weighting factor to the respective likelihood parameters respectively indicative of the depth order of the first and second objects, and (iii) identifying which of the first and second objects said pixel represents on the basis of the weighted first and second likelihood parameters.

The term appearance model is intended to refer to a distribution of appearance features relating to a particular candidate object. In the preferred embodiment, a normalised colour histogram is used to model the appearance of a candidate object. This type of appearance model is found to be both effective and simple compared with other types of appearance models which tend to introduce localised spatial correlation information through the use of a costly correlogram.

For the sake of clarity, it will be understood that, in step (c), the identification of a group candidate object refers to the identification of a candidate object whose appearance results from the detected merging of real-life objects represented by the first and second candidate objects identified in step (a).

The first and second weighting factors may be selected from a plurality of predetermined values, the selection being dependent on which of the first and second objects occupies an upper layer and which occupies a lower level in the first frame. The depth order may be determined according to which of the first and second objects is nearer to a reference position in the frame, the object nearest the reference position being assigned to the upper level and the other object being assigned to the lower level. For example, the depth order can be determined according to which of the first and second objects is nearer to a reference line extending across the frame, the object nearest the reference line being assigned to the upper level and the other object being assigned to the lower level.

Alternatively, or additionally, the depth order is determined according to the change in number of pixels defining the respective first and second objects over a plurality of frames generated prior to the second frame, the object having the greatest change in number of pixels being assigned to the lower level and the other object being assigned to the upper level.

The depth order can be verified by analysing the change in the number of pixels defining the respective first and second objects over a plurality of frames generated prior to the second frame, the object assigned to the upper level being reassigned to the lower level if the number of pixels defining said object has the greatest change in number of pixels.

The first and second appearance models can represent the respective colour distribution of the first and second candidate objects. Alternatively, the first and second appearance models can represent a combination of the respective (a) colour distribution of, and (b) edge density information for, the first and second candidate objects. Edge density information can be derived from a Sobel edge detection operation performed on the candidate object.

Step (c) can comprise identifying a new candidate object whose frame position partially overlaps the respective frame positions of the first and second candidate objects identified in (a). Further step (c) can comprise identifying that the number of candidate objects in the second frame is less than the number of candidate objects identified in the first frame, and identifying a new candidate object whose frame position partially overlaps the respective frame positions of the first and second candidate objects identified in (a).

According to a second aspect of the invention, there is provided a method of segmenting a foreground object in a frame of a video sequence, the foreground object being defined by a plurality of foreground pixels, the method comprising: (a) identifying, in a first frame, first and second foreground objects; (b) identifying, in a subsequent frame, a third foreground object resulting from the merging of the first and second objects; (c) classifying each pixel of the third object as representing either the first or second foreground object on the basis of a correspondence metric indicating to which of the first or second foreground objects said pixel most likely corresponds, said correspondence metric being dependent on appearance features of the first and second foreground objects and a respective weighting factor associated with the first and second foreground objects, said weighting factor being indicative of at least the depth order of the foreground object with which it is associated.

According to a third aspect of the invention, there is provided a computer program stored on a computer readable medium, the computer program comprising instructions arranged, when executed on a processor, to perform the steps of (a) identifying, in a first frame, first and second foreground objects; (b) identifying, in a subsequent frame, a third foreground object resulting from the merging of the first and second objects; (c) classifying each pixel of the third object as representing either the first or second foreground object on the basis of a correspondence metric indicating to which of the first or second foreground objects said pixel most likely corresponds, said correspondence metric being dependent on appearance features of the first and second foreground objects and a respective weighting factor associated with the first and second foreground objects, said weighting factor being indicative of at least the depth order of the foreground object with which it is associated.

According to a fourth aspect of the invention, there is provided an image processing system comprising: means arranged to receive a sequence of frames from a video source; and processing means arranged to (i) identify, in a first frame, first and second foreground objects, (ii) identify, in a subsequent frame, a third foreground object resulting from the merging of the first and second objects, and (iii) classify each pixel of the third object as representing either the first or second foreground object on the basis of a correspondence metric indicating to which of the first or second foreground objects said pixel most likely corresponds, said correspondence metric being dependent on appearance features of the first and second foreground objects and a respective weighting factor associated with the first and second foreground objects, said weighting factor being indicative of at least the depth order of the foreground object with which it is associated.

The invention will now be described, by way of example, with reference to the accompanying drawings, in which.

Figure 2:
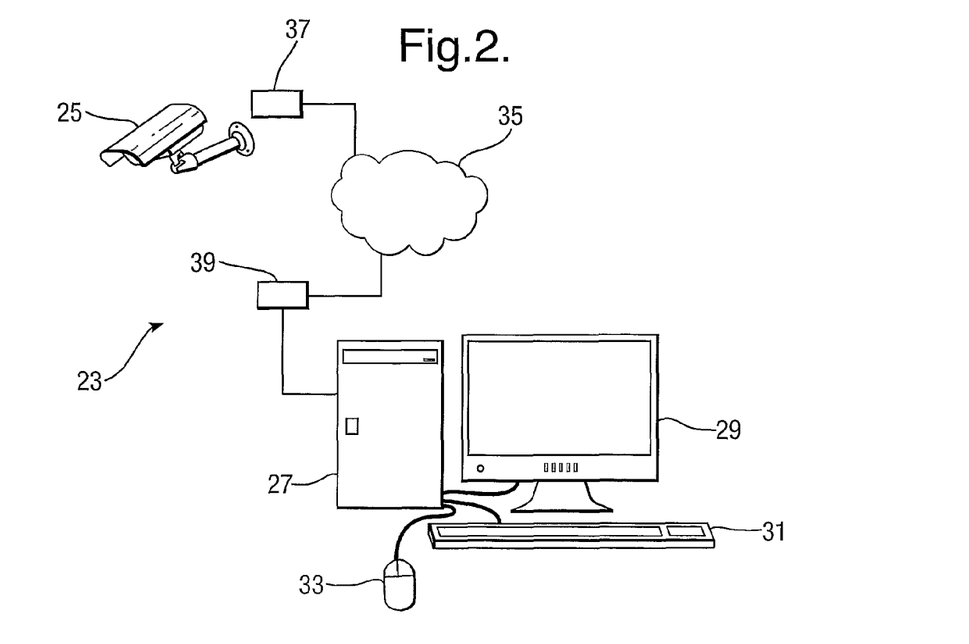
FIG. 2 is a block diagram showing, schematically, hardware elements forming part of an intelligent video surveillance system.

Referring to FIG. 2, an intelligent video surveillance system 10 comprises a camera 25, a personal computer (PC) 27 and a video monitor 29. Conventional data input devices are connected to the PC 27, including a keyboard 31 and mouse 33. The camera 25 is a digital camera and can be, for example, a webcam such as the Logitec™ Pro 4000 colour webcam. Any type of camera capable of outputting digital image data can be used, for example a digital camcorder or an analogue camera with analogue-to-digital conversion means such as a frame grabber. The captured video is then encoded using a standard video encoder such as motion JPEG, H.264 etc. The camera 25 communicates with the PC 27 over a network 35, which can be any network such as a Local Area Network (LAN), a Wide Area Network (WAN) or the Internet. The camera 25 and PC 27 are connected to the network 35 via respective network connections 37, 39, for example Digital Subscriber Line (DSL) modems. Alternatively, the web camera 11 can be connected directly to the PC 27 by means of the PC's universal serial bus (USB) port. The PC 27 may comprise any standard computer e.g. a desktop computer having a 2.6 GHz processor, 512 Megabytes random access memory (RAM), and a 40 Gigabyte hard disk drive. The video monitor 29 is a 17" thin film transistor (TFT) monitor connected to the PC 27 by a standard video connector.

Video processing software is provided on the hard disk drive of the PC 27. The software is arranged to perform a number of processing operations on video data received from the camera 25. The video data represents individual frames of captured video, each frame being made up of a plurality of picture elements, or pixels. In this embodiment, the camera 25 outputs video frames having a display format of 640 pixels (width) by 480 pixels (height) at a rate of 25 frames per second. For running efficiency, subsampling of the video sequence in both space and time may be necessary e.g. 320 by 240 pixels at 10 frames per second. Since the camera 25 is a colour camera, each pixel is represented by data indicating the pixel's position in the frame, as well as the three colour components, namely red, green and blue components, which determine the displayed colour.

The above-mentioned video processing software can be initially provided on a portable storage medium such as a floppy or compact disk. The video processing software is thereafter setup on the PC 27 during which operating files and data are transferred to the PC's hard disk drive. Alternatively, the video processing software can be transferred to the PC 27 from a software vendor's computer (not shown) via the network link 35.

The video processing software is arranged to perform the processing stages indicated in FIG. 1, although, as will be described later on, the robust tracking block 3 operates in a different way. Accordingly, this detailed description concentrates on the robust tracking block 3, although an overview of the object segmentation block 1 will first be described.

Object Segmentation Block 1

The video processing software initially runs a background learning stage 7. The purpose of this stage 7 is to establish a background model from an initial segment of video data. This video segment will typically comprise one hundred frames, although this is variable depending on the surveillance scene concerned and the video sampling rate. Since the background scene of any image is likely to remain relatively stationary, compared with foreground objects, this stage establishes a background model in which ideally no foreground objects should be visible.

Following background learning 7, the background subtraction stage 9 analyses each pixel of the current frame. Each pixel is compared with the pixel occupying the corresponding position in the background model to estimate whether the pixel of the current frame represents part of a foreground region or background. Additionally, slow changes in the background model are updated dynamically whilst more severe or sudden changes may require a relearning operation.

Various methods for performing background learning and background subtraction are known in the art. A particularly effective method of performing both is the so-called Mixture of Gaussian (MoG) method described in detail by Stauffer & Grimson in 'Learning Patterns of Activity Using Real-Time Tracking', IEEE Transactions on Pattern Analysis and Machine Intelligence, Vol. 22, No. 8, August 2000, pp. 747-757. Such a method is also used by Javed, and Shah, M, in "Tracking and object classification for automated surveillance", Proc. of ECCV'2002, Copenhagen, Denmark, pp. 343-357, May-June 2002.

In summary, at each pixel location, a Gaussian mixture model (GMM) is used to model the temporal colour variations in the imaging scene. The Gaussian distributions are updated with each incoming frame. The models are then used to determine if an incoming pixel is generated by the background process or a foreground moving object. The model allows a proper representation of the background scene undergoing slow and smooth lighting changes.

Following the background subtraction stage 9, a false-foreground suppression stage 11 attempts to alleviate false detection problems caused by noise and camera jitter. For each pixel classified as a foreground pixel, the GMMs of its eight connected neighbouring pixels are examined. If the majority of them (more than five) agree that the pixel is a background pixel, the pixel is considered a false detection and removed from foreground.

In the next stage 15, a shadow/highlight removal operation is applied to foreground regions. It will be appreciated that the presence of shadows and/or highlights in a video frame can cause errors in the background subtraction stage 9. This is because pixels representing shadows are likely to have darker intensity than pixels occupying the corresponding position in the background model 19. Accordingly, these pixels may be wrongly classified as foreground pixels when, in fact, they represent part of the background. The presence of highlights can cause a similar problem.

A number of shadow/highlight removal methods are known. For example, in Xu, Landabaso and Lei (referred to in the introduction) a technique is used based on greedy thresholding followed by a conditional morphological dilation. The greedy thresholding removes all shadows, inevitably resulting in true foreground pixels being removed. The conditional morphological dilation aims to recover only those deleted true foreground pixels constrained within the original foreground mask.

The final stage of the object segmentation block 1 involves the constrained component analysis stage (CCA) 15. The CCA stage 15 groups all pixels presumably belonging to individual objects into respective blobs. As will be described in detail below, the blobs are temporally tracked throughout their movements within the scene using the robust tracking block 3.

In accordance with a preferred embodiment of the invention, the robust tracking block 3 shown in FIG. 1 is replaced by a new matching process stage 41. The processing elements of the matching process stage 41 are shown schematically in FIG. 3. Note that the terms 'object' and 'blob' are used throughout the description. The term 'object' denotes a tracked object whilst the term 'blob' denotes a newly-detected foreground region in the incoming frame.

Figure 3:
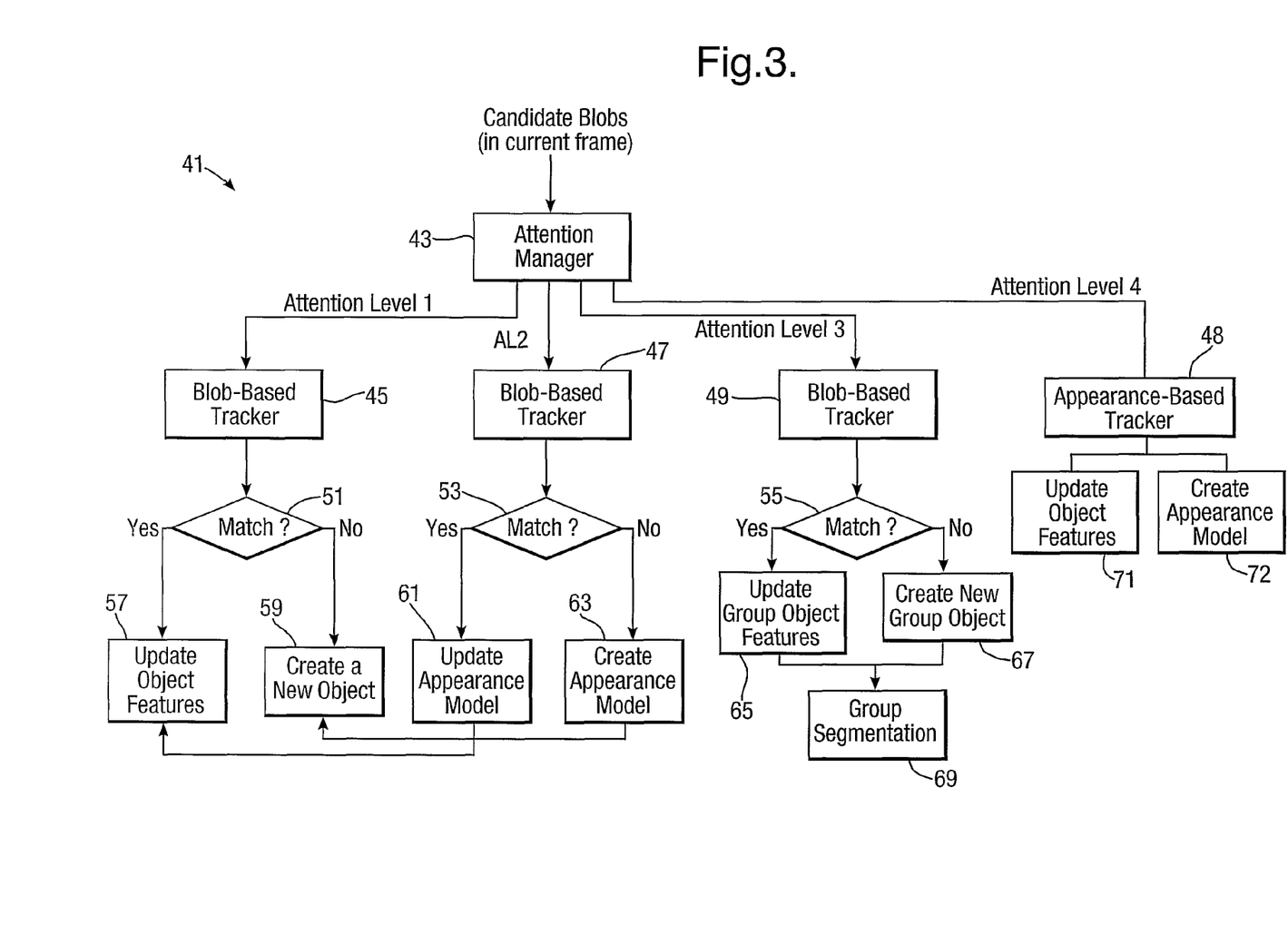
FIG. 3 is a block diagram showing functional elements of a robust tracking block according to an embodiment of the invention.

Referring to FIG. 3, for each incoming frame, candidate blobs from the object segmentation block 1 are received by an attention manager stage 43. The attention manager stage 43 is arranged to analyse the blobs and to assign each to one of four possible 'attention levels' based on a set of predefined rules. Subsequent processing steps performed on the blobs are determined by the attention level assigned thereto.

Figure 4A:
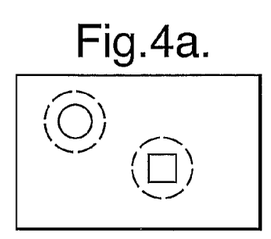
FIGS. 4a-4d show four sequential video frames indicating the relative positions of first and second objects at different time slots.

In a first test, the distance between different blobs is computed to establish whether or not there is an overlap between two or more blobs. For those blobs that do not overlap and whose distance with respect to their nearest neighbour is above a predetermined threshold, attention level 1 is assigned. This situation is illustrated in FIG. 4(*a*). Note that blobs occluded by static or background structures are not affected in this test. The distance can be computed in terms of a vector distance between the blob boundaries, or alternatively, a distance metric can be used.

Figure 4B:
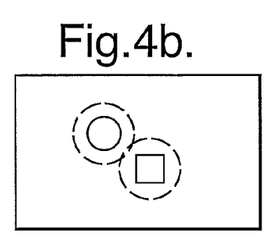

In the event that the computed distance between any two blobs is less than the predetermined threshold, the blobs concerned are assigned 'attention level 2' status. The purpose of this test is to identify blobs just prior to an occlusion/merging event. This situation is illustrated in FIG. 4(*b*).

Figure 4C:
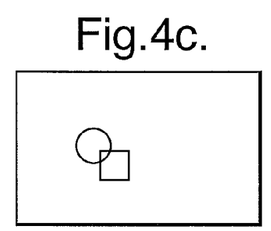

In the event that each of a set of conditions is met, the blobs concerned are assigned 'attention level 3' status. Attention level 3 indicates that occlusion is taking place since two or more blobs are merging, as illustrated in FIG. 4(*c*). In order to detect an occlusion, a comparison is necessary between the status of blobs in the current frame and the respective status of objects already being tracked. The set of conditions is as follows:

A. the number of blobs in the incoming frame is less than the number of objects currently being tracked;
B. a blob overlaps two or more objects currently being tracked; and
C. the tracked objects identified in B are not 'new', i.e. they are trusted objects that have been tracked for a predetermined number of frames.

Figure 5A:
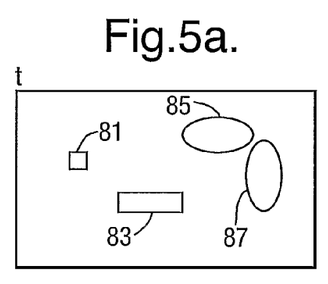
FIGS. 5a and 5b show, respectively, a first video frame showing a plurality of objects prior to an occlusion event, and a second video frame showing said objects during an occlusion event.
Figure 5B:
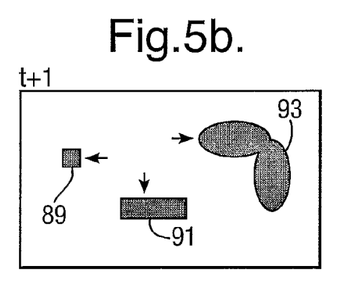

To explain this process, reference is made to FIGS. 5(*a*) and 5(*b*), which show, respectively, four objects 81, 83, 85, 87 being tracked in a frame t, and three blobs 89, 91, 93 in a current frame t+1. It will be noted that two of the objects 85, 87 being tracked in frame t have moved in such a way that a group blob 93 now appears in frame t+1. Clearly, condition A is satisfied since there are three blobs, as compared with the four objects being tracked. The group blob 93 overlaps the two objects 85, 87 in frame t from which the group blob is derived and so condition B is satisfied. Therefore, provided the two tracked objects 85, 87 have been classified as 'real' (as opposed to 'new') by the tracker then group blob 93 is assigned to 'attention level 3'. The classification of objects as 'new' or 'real' will be explained further on below with respect to the blob-based tracker stages.

Figure 4D:
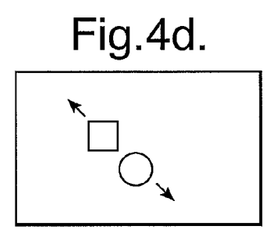

Finally, in the event that a different set of conditions are met, which conditions are indicative of a group splitting situation, the blobs concerned are assigned 'attention level 4'status. Attention level 4 indicates that objects previously involved in an occlusion event have now moved apart, as illustrated in FIG. 4(*d*). In order to detect splitting, the following conditions are detected:

A. the number of blobs in the current frame is greater than the number of objects being tracked;
B. there is at least one known group object; and
C. the group object in B overlaps at least two blobs.

Having explained the assignment of blobs to one of the four attention levels, the resulting processing steps applied to each blob will now be described.

Attention Level 1 Processing

In this case, the or each blob in the frame is processed by a blob-based spatial tracker 45. Blob-based tracking involves temporally tracking the movement of blobs, frame by frame, using the so-called temporal templates. A detailed description of blob-based tracking now follows.

Figure 6A:
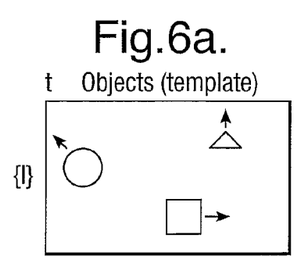
FIGS. 6a and 6b show first and second sequential video frames which are useful for understanding a blob tracking stage used in the embodiment of the invention.
Figure 6B:
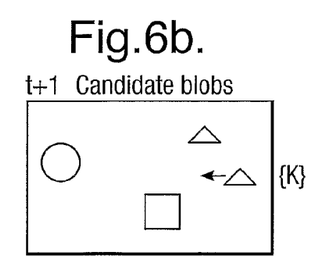

FIG. 6 shows an example where three objects, indexed by 1, have been tracked to frame t, and the tracker seeks to match therewith newly detected candidate blobs (indexed by k) in a subsequent frame t+1. One of the four candidate blobs (near the right border) just enters the scene, for which a new template will be created in a later stage 59 since no match will occur at stage 51. Each of the three objects in frame t is modelled by a temporal template comprising a number of persistent characteristic features. The identities of the three objects, and their respective temporal templates, are stored in an object queue. Different combinations of characteristic features can be used, although in this embodiment, the template comprises a set of five features describing the velocity, shape and colour of each object. These features are indicated in table 1 below.

TABLE 1

Example of a feature set used in blob-based tracking

| Feature | Description |
|---|---|
| $v = (v_x, v_y)$ | The object's velocity at its centroid $((p_x, p_y))$ |
| S | The size, or number of pixels contained in the object |
| R | The ratio of the major and minor axes of the best-fit ellipse of the object - provides a better descriptor of an object's posture than its bounding box |
| θ | The orientation of the major axis of the ellipse |
| C | The dominant colour, computed as the principal eigenvector of the colour co-variance matrix for pixels within the object |

Therefore, at time t, we have for each object I centred at $(P_{Ix}, P_{Iy})$ a template of features $M_I(t)=(v_I, s_I, r_I, \theta_I, c_I)$. There are two points that first require clarification. Firstly, prior to matching the template of I with a candidate blob k in frame t+1, which is centred at $(P'_{kx}, P'_{ky})$ having a template $B_k(t+1)=(v'_k, s'_k, r'_k, \theta'_k, c'_k)$, Kalman filters are used to update the template $M_I(t)$ by predicting, respectively, its new velocity, size, aspect ratio and orientation in $M_I(t+1)$. The velocity of a candidate blob k is calculated as $V'_k = (P'_{kx}, P'_{ky})^T - (P_{Ix}, P_{Iy})^T$. The difference between the dominant colour of template I and that of candidate blob k is defined as:

$$d_{IK}(c'_I, c'_k) = 1 - \frac{c_I \cdot c_k}{\|c_I\| \cdot \|c_k\|} \quad (1)$$

The mean $\overline{M}_I(t)$ and variance $V_I(t)$ vector of a template I are updated when a matching candidate blob k is found. These are computed using the most recent L blobs on the track, or over a temporal window of L frames, e.g. L=50. The set of Kalman filters, $KF_I(t)$, is updated by feeding it with the corresponding feature value of the matched blob. The variance of each template feature is analysed and taken into account in the matching process described below to achieve a robust tracking result.

The next stage employed in blob-based tracking is to compute, for each combination of objects I and blobs k pairs, a distance metric indicating the degree of match between each respective pair. For example, it is possible to use the known Mahalanobis distance metric, or, alternatively, a scaled Euclidean distance metric, as expressed by:

$$D(l, k) = \sqrt{\sum_{i=1}^{N} \frac{(x_{li} - y_{ki})^2}{\sigma_{li}^2}} \quad (2)$$

where the index i runs through all N=5 features of the template, and $\sigma_{li}^2$ is the corresponding component of the variance vector $V_I(t)$. Note that the dominant colour feature can be viewed as $x_{li} - y_{ki} = d_{IK}(c_I, c'_k)$. The initial values of all components of $V_I(t)$ are either set at a relatively large value or inherited from a neighbouring object.

Having defined a suitable distance metric, the matching process, represented by stage 51 in FIG. 3, will be described in greater detail as follows.

As described above, for each object I being tracked so far, we have stored in the object queue the following parameters:

| | |
|---|---|
| $M_I(t)$ | the template of features |
| $(\overline{M}_I(t) V_I(t))$ | the mean and variance vectors |
| $KF_I(t)$ | the related set of Kalman Filters |
| $TK(t) = n$ | the counter of tracked frames, i.e. current track length |
| $MS(t) = 0$ | the counter of lost frames |
| $\hat{M}_I(t+1)$ | the expected values in t + 1 by Kalman prediction |

In the matching step 51, for each new frame t+1, all valid candidate blobs $\{k\}$ are matched against all the existing tracks $\{l\}$ using equation (2) above by way of the template prediction, $\hat{M}_I(t+1)$, variance vector $V_I(t)$ and $B_k(t+1)$. A ranking list is then built for each object l by sorting the matching pairs from low to high cost. The matching pair with the lowest cost value D(l,k) which is also less than a threshold, THR, e.g. 10 in this case, is identified as a matched pair.

If a match occurs in stage 51, the track length TK(t+1) is increased by 1 and the above-described updates for the matched object l are performed in a subsequent stage 57. In particular, we obtain $M_I(t+1) = B_k(t+1)$, as well as the mean and variance $\overline{M}_I(t+1)$, $V_I(t+1)$ respectively, and correspondingly, the Kalman filters $KF_I(t+1)$.

If object I has found no match at all in frame t+1, presumably because it is missing of occluded, then the mean of its template is kept the same, or $\overline{M}_I(t+1) = \overline{M}_I(t)$. The lost counter MS(t+1) is incremented and the object I is carried over to the next frame. The following rules apply to this case:

If object I has been lost for a certain number of frames, or MS(t+1)≧MAX_LOST (e.g. 10 frames) then it is deleted from the scene; the possible explanations include the object becoming static (merging into the background), the object entering into a building/car, or simply leaving the camera's field of view;

Otherwise, the variance $V_I(t+1)$ is adjusted using the expression $\sigma_i^2(t+1) = (1+\delta)\sigma^2(t)$ where $\delta = 0.05$; since no observation is available for each feature, the latest template mean vector is used for prediction, which states that $M_I(t+1) = M_I(t) + \overline{M}_I(t)$.

For each candidate blob k in frame t+1 that is not matched, a new object template $M_k(t+1)$ is created from $B_k(t+1)$, this stage being indicated in FIG. 3 by reference numeral 59. The choice of initial variance vector $V_k(t+1)$ needs some consideration-it can be copied from either a very similar object already in the scene or typical values obtained by prior statistical analysis of tracked object, however, will not be declared 'real' until after it has been tracked for a number of frames, or TK(t+1)>=MIN_SEEN, e.g. 10 frames, so as to discount any short momentary object movements. Prior to this, tracked objects are classified as 'new'. If an object is lost before it reaches 'real' it is simply deleted.

The classification of an object as 'new' or 'real' is used to determine whether or not the positional data for that object is recorded in a trajectory database. An object is not trusted until it reaches 'real' status. At this time, its movement history is recorded and, if desired, a trail line is displayed showing the path being taken by the object.

Following the above-mentioned tracking steps, the process repeats from the attention manager stage 43 for the or each blob in the next incoming frame t+2 and so on.

In general, blob-based tracking is found to be particularly effective in dealing with sudden changes in an object's appearance which may be caused by, for example, the object being occluded by a static object, such as a video sequence in which a person walks and sits down behind a desk with only a small part of the upper body being visible. Other tracking methods, such as appearance-based tracking methods, often fail to maintain a match when such dramatic appearance changes occur.

Attention Level 2 Processing

As mentioned above, 'attention level 2' status is assigned to two or more blobs that are about to occlude. In this case, the relevant blobs continue to be tracked using a blob-based tracking stage (indicated by reference numeral 47 in FIG. 3). In this case, however, following the match decision stage 53, an appearance model is either created or updated for the relevant blobs depending on whether or not a match is made. The appearance model for a particular blob comprises a colour histogram indicating the frequency (i.e. number of pixels) of each colour level that occurs within that blob. To augment the histogram, an edge density map may also be created for each blob. The appearance model is defined in detail below.

First, we let I be a detected blob in the incoming frame. The colours in I are quantified into m colours $c_1, \ldots, c_m$. We also let I(p) denote the colour of a pixel $p = (x,y) \in I$, and $I_c \equiv \{p | I(p) = c\}$. Thus, $p \in I_c$ means $p \in I, I(p) = c$. We denote the set $1, 2, \ldots, n$ by $[n]$. The normalised colour histogram h of I is defined for $i \in [m]$ such that $h_I(c_i)$ gives, for any pixel in I, the probability that the colour of the pixel is $c_i$. Given the count, $H_I(c_i) \equiv |\{p \in I_{c_i}\}|$, it follows that, $$h_I(c_i) = \frac{H_I(c_i)}{|I|} \quad (3)$$

In a similar manner, we define an edge density map $g_I(e_j)$ for the same blob so as to complement the colour histogram. First, an edge detector (which can be the known horizontal and vertical Sobel operator) is applied to the intensity image. Then, after noise filtering, the resulting horizontal and vertical edges of a pixel are respectively quantified into 16 bins each. This will create a one-dimensional edge histogram of N=32 bins.

As indicated in FIG. 3, if a new appearance model is created in stage 63, a new object template is created in stage 59. Similarly, if an existing appearance model is updated in stage 61, updating of the blob's temporal template takes place (as before) in stage 57. The process repeats again for the next incoming frame at the attention manager stage 43.

Attention Level 3 Processing

In the case where two or more blobs overlap or merge, the following four tasks are performed.

First, the merged blobs are considered to represent a single 'group blob' by a blob-based tracker stage 49. Initially, it is likely that no match will occur in stage 55 and so a new group blob will be created in stage 67. This involves creating a new temporal template for the group blob which is classified as 'new', irrespective of the track lengths of the respective individual blobs prior to the merge. If there is a match in stage 55, the temporal template of the group object to which it matched is updated in stage 65. Following stages 65 and 67, group segmentation is performed on the group blob in stage 69.

Group Segmentation (or pixel re-classification as it is sometimes known) is performed to maintain the identities of individual blobs forming the group blob throughout the occlusion period. To achieve this, the above-mentioned appearance model, created for each blob in attention level 2, is used together with a maximum likelihood decision criterion. During group segmentation, the appearance models are not updated.

In very complex occlusion situations, it is possible for the segmentation operation to fail. For example, if a partial occlusion event occurs and lasts for a relatively long period of time (e.g. if the video captures two people standing close together and holding a conversation) then it is possible that segmentation will fail, especially if the individual objects are not distinct in terms of their appearance. In order to maintain tracking during such a complex situation, there is an interplay between the above-described blob tracker, and an additional appearance-based tracker. More specifically, at the time when occlusion occurs, one of the objects in the group is identified as (i) having the highest depth order, i.e. the object is estimated to be furthest from the camera, and (ii) being represented by a number of pixels which is tending to decrease over time. Having identified such an object, its temporal template is updated using Kalman filtering. Here, the aim is to allow the Kalman filter to predict the identified object's features throughout the occlusion event such that, when the occluded objects split, each object can be correctly matched. A method for identifying the depth order of a particular object is described below in relation to the segmentation operation.

Attention Level 4 Processing

In the case where a group object has split, the identities of the individual objects are recovered through appearance-based tracking. Referring back to FIG. 3, it will be seen that an appearance based tracker 48 is employed which operates on the respective colour appearance models for the objects concerned.

As is known in the art, colour appearance models can be used for matching and tracking purposes. These actions imply comparing the newly detected foreground regions in the incoming frame with the tracked models. A normalised $L_1$ distance, as defined below, is used.

$$D_h(I, I') \equiv \frac{\sum_{\forall i \in [m]} |h_I(c_i) - h_{I'}(c_i)|}{\sum_{\forall j \in [m]} |h_I(c_j) - h_{I'}(c_j)|}$$

where I and I', represent a model and a candidate blob, respectively. Matching is performed on the basis of the normalised distance, a smaller distance indicating a better match.

In a dynamic visual scene, the lighting conditions as well as an object's pose, scale, and perceived colours often change with time. In order to accommodate these effects, each object's temporal template and appearance model is updated in blocks 71 and 72 respectively. In the case of the appearance model, we use a first-order updating process:

$$h_I(c_i,t) = \alpha \cdot h_I(c_i,t-1) + (1-\alpha) \cdot h_I^{new}(c_i, t)$$

where $h_I^{new}(c_i,t)$ is the histogram obtained for the matched object at time t, $h_I(c_i,t-1)$ the stored model at time t−1, and $h_I(c_i,t)$ the updated model at time t. $\alpha$ is a constant ($0 < \alpha < 1$) that determines the speed of the updating process. The value of $\alpha$ determines the speed at which the new information is incorporated into the model-the smaller the value, the faster the incorporation. In this embodiment a value of $\alpha=0.9$ is used. Note, however, that updating should only occur when the object is not occluded by other moving objects, although occlusions by stationary objects is acceptable.

Group Segmentation Stage 69

Figure 7A:
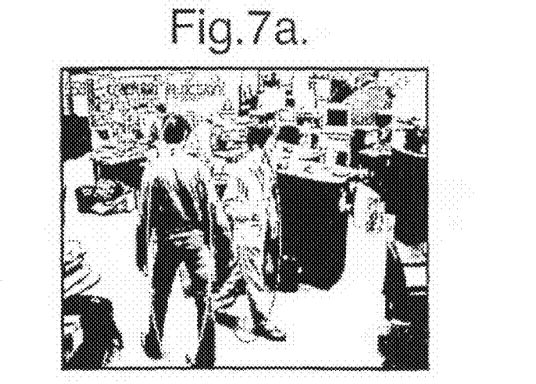
FIGS. 7, 8 and 9 show video frames the appearance of which are useful for understanding a group object segmentation stage used in the embodiment of the invention.
Figure 7B:
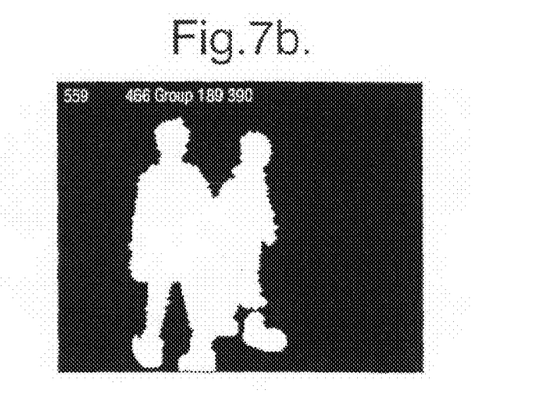
Figure 7C:
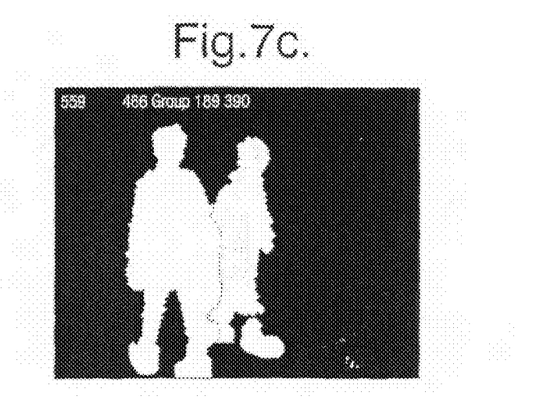

As mentioned above, group segmentation is performed on grouped blobs in attention level 3. A known method for performing group segmentation is based on Huang et al. in "Spatial colour indexing and applications," International Journal of Computer Vision, 35(3), 1999. The following is a description of the segmentation method used in the present embodiment. To summarise the method, for each pixel of the group blob, we calculate the likelihood of the pixel belonging to an individual blob forming part of the group blob. The likelihood calculation is based on the appearance model generated for that individual blob in attention level 2. This process is repeated for each of the blobs forming part of the group blob. Following this, the pixel is classified to the individual blob returning the highest likelihood value. The aim of the group segmentation stage 69 is illustrated in FIGS. 7(a) to 7(c) which show, respectively, (a) an original video frame, (b) the resulting group blob and (c) the ideal segmentation result. Having segmented the group blob, it is possible to maintain the identities of the two constituent objects during the occlusion such that, when they split, no extra processing is required to re-learn the identities of the two objects.

The group segmentation stage 69 is now considered in detail.

Given a set of objects $M_i$, i∈S and a detected group blob G resulting from the merge of two or more objects, and assuming that all the models have equal prior probability, then a pixel p∈G with a colour $c_p$ is classified as belonging to the model $M_m$, if and only if:

$$m = \underset{i \in S}{\operatorname{argmax}} \prod_p (G \mid M_i) \quad (4)$$

where $\Pi_p(G|M_i)$ is the likelihood of the pixel p∈G belonging to the model $M_i$. Given that w(p) is a small window centred at p, for smoothness purposes we can define, $$\prod_p (G \mid M_i) \equiv \sum_{q \in w(p)} \pi_{c_q, h}(G \mid M_i) \quad (5)$$

where, $$\pi_{c_q, h}(G \mid M_i) \equiv \min\left\{\frac{H_{M_i}(c_q)}{H_G(c_q)}, 1\right\} \quad (6)$$

is the colour histogram contribution to the likelihood that a pixel q of colour $c_q$ inside the blob G belongs to the model $M_i$. Similarly, an edge density-based histogram contribution of the pixel q of edge strength $e_q$ can be used to augment the likelihood function.

Since a colour histogram does not contain local spatial correlation information, a new parameter is introduced, namely the Spatial-Depth Affinity Metric (SDAM). In particular, a modified version of the above-described likelihood function equation Π' is provided, expressed as:

$$\Pi'_p(G \mid M_i) = \Gamma_p(M_i) O_p(M_i) \Pi_p(G \mid M_i) \quad (7)$$

where $$\Gamma_p(M_i) = \frac{1}{1 + \lambda \cdot d(x, C^x_{M_i})},$$

and $$O_p(M_i) = \beta$$

$\Gamma_p(M_i) O_p(M_i)$ is the newly-defined SDAM, which includes two parts. In the first part, $\Gamma_p(M_i)$ takes account of the spatial affinity of a non-occluded pixel p=(x,y) belonging to the appearance model $M_i$ as a function of, $d(x, C_{m_i}^x)$-the $L_1$ distance between the x-axis of the pixel and that of the currently predicted centroid of the object. λ is a constant value close to 1 (e.g., λ=0.99). $\Gamma_p(M_i)$ is also referred to as the spatial affinity metric (SAM). In the second part, $O_p(M_i)=\beta$ which explains the depth affinity of the pixel p with model $M_i$ in terms of a discrete weighting value that is a function of the depth ordering of the model.

The effect of the SAM and the SDAM on the original likelihood function is now considered.

Figure 8A:
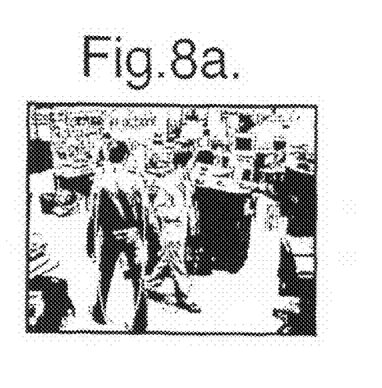
Figure 8B:
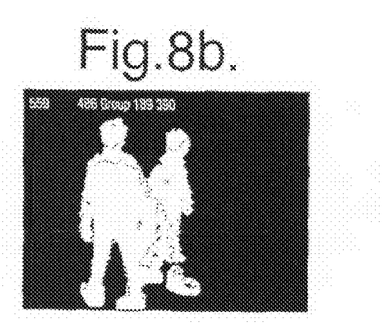
Figure 8C:
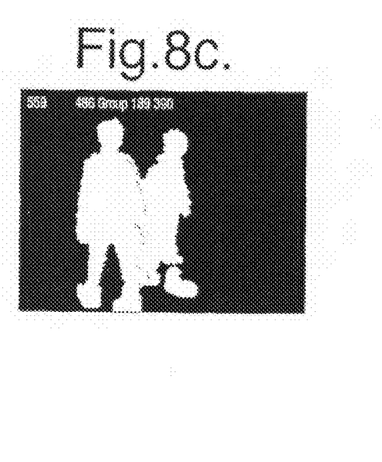

First, we consider the effect of the SAM by setting β=1. The new likelihood function Π' allows error correction for those pixels classified as belonging to an object (say object A) judged by the colour appearance metric only, but which are located further away from the predicted central axis of object A than other alternatives. As such, the segmentation results are improved considerably. An example is shown in FIGS. 8(a) to 8(c) which show, respectively, (a) an input video frame, (b) the object segmentation result without using the SAM in the likelihood function, and (c) the object segmentation result using the SAM in the likelihood function. In FIG. 8(c), note that errors in similar colour regions are almost completely removed.

Figure 9A:
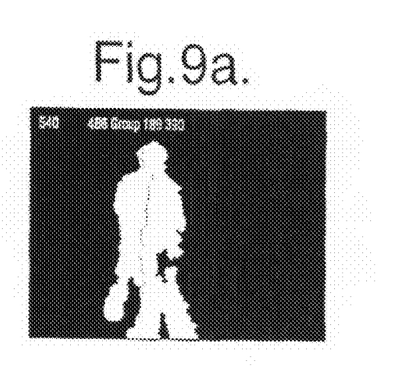
Figure 9B:
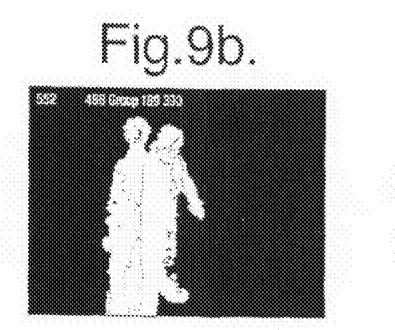
Figure 9C:
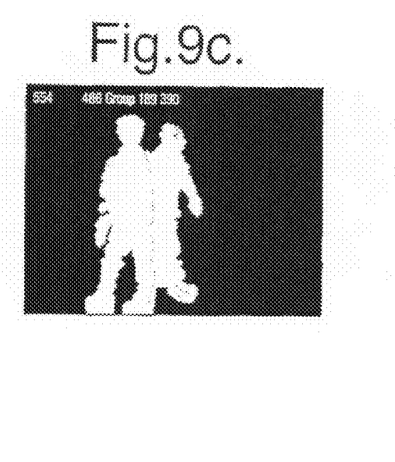

There is one major drawback in using the SAM for object segmentation purposes. During a group merging situation where two moving objects switch positions, e.g. when two people walking in opposite directions pass each other, the SAM produces an undesirable effect-a vertically-oriented false detection zone corresponding to the previous centroid position. This effect is shown stage by stage in FIGS. 9(a) to 9(c).

To remedy this defect, the SAM of each pixel in the group should be weighted differently. It is for this reason we use the SDAM which takes into account the weighting parameters β which is varied for each object to reflect the layered scene situation. This β variation can be achieved by exploring the relative 'depth order' of each object within the group-the relationship between the relative depth of an object and its impact on the likelihood function can be defined as 'the closer an object is to the camera, the greater its contribution to the likelihood function'. In practice, it is found that the likelihood function works well if the value of β is reduced by 0.1 based on the object's relative depth. For example, an object at the top level (non-occluded) will have β=1, an object deemed to be further away will have β=0.9 and so on.

Given that, in most cases, objects will merge and then split, as in FIGS. 9(a) to 9(d), the desired variation in the likelihood function for a pixel is shown in FIGS. 10(a) to 10(d) which show, respectively, the likelihood function of a pixel (a) before merging, (b) and (c) during merging, and (d) after merging. The curve labelled A indicates the likelihood function of the object having greater depth.

We now consider the method by which the value of β is selected to reflect the relative depth order of the individual objects.

Depth Order Estimation

Several approaches have been suggested to automatically estimate depth order. McKenna et al. in "Tracking groups of people", Computer Vision and Image Understanding, 80(1), October 2000, define a 'visibility index' which is the ratio between the number of visible pixels representing each object during occlusion and the expected number of pixels for that object when isolated. This visibility index is used to measure depth. A high visibility index indicates an object (in this case, a person) at the top level, i.e. nearest the camera. While this method can be used for estimating depth order, it is difficult to implement where more than two objects merge. Elgammal et al. disclose, in "Background and foreground modelling using nonparametric Kernal density estimation for visual surveillance", Proc. IEEE, 90(7), July 2002, a method to model occlusions by assigning a relative depth to each person in the group based on the segmentation result. In this case, the method can be generalised to the case of N objects. The use of the segmentation result leads to the evaluation of different hypotheses about the arrangement of objects.

In the present embodiment, we consider two methods for acquiring depth order information of group objects. The first method is a segmentation-based method which involves the detection of, and reasoning with, a so-called 'overlapping zone'. The second method uses information concerning the scene geometry, together with an additional verification process, and, if necessary, examining the trend (over successive frames) of the number of pixels being re-classified as belonging to each component object.

Method 1-Overlapping Zone

When a merge between two or more objects is detected, a first-order model can be used to predict the centroid location of each object. The textural appearance of each object is correlated with the merged image at the centroid location to find a best fit. Given a best-fit location, a shape probability mask can then be used to determine 'disputed pixels', namely those pixels having non-zero value in more than one of the objects' probability masks. This group of pixels is called the 'overlapping zone'. An illustration of the overlapping zone is shown schematically in FIG. 9. Once the overlapping zone is determined, objects are ordered so that those assigned fewer 'disputed' pixels are given greater depth. This method is known per se and disclosed in Senior et al in "Appearance models for occlusion handling" Proc. Of PETS '01, Hawaii, USA, December 2001.

In our group segmentation stage 69, since there is no shape-based probabilistic mask, we can instead use an object's 'silhouette' taken from the most recent time to approximate the object's extent. Also, to locate properly the silhouettes of the constituent objects when they form a group, the technique introduced by Haritaoglu et al in "W4: Realtime surveillance of people and their activities" IEEE Transactions on Pattern Analysis and Machine Intelligence, 22(8) August 2000 can be used. The method computes the one-dimensional horizontal 'projection histogram' of the group silhouette by projecting the binary foreground region onto an axis perpendicular to the major axis of the blob. As upright positions are assumed, the two peaks (or heads in the case of this reference) that correspond to the x-position of the major axis of the blobs can easily be identified from the projection of the silhouette. By displacing the objects' silhouettes to their respective new x-positions, the overlapping zone is defined. From the 'disputed' pixels within the overlapping zone, pixel re-classification is carried out, and depth ordering determined.

This approach works well in most cases, although there may be problems in scenarios where people, and therefore their heads, can not be detected. Also, the perspective projection of the camera often leads to situations where it is nearly impossible to detect heads with the histogram projection technique. In addition, classification is based on colour appearance only which can be prone to errors. Therefore, in the present embodiment, an alternative method of computing the depth order is proposed to improve the group segmentation stage 69 and so ensure robust object tracking.

Method 2-Scene Geometry

In this preferred method of estimating the depth order of objects, so-called 'top down' and 'bottom up' approaches are made based on scene geometry. Specifically, the top down approach is first used to provide an estimate of the depth order of objects, after which the bottom up approach is used for verification. Based on these steps, we obtain a final depth order which is used in determining which value of β is assigned to each pixel in the likelihood function of equation (7).

Figure 10A:
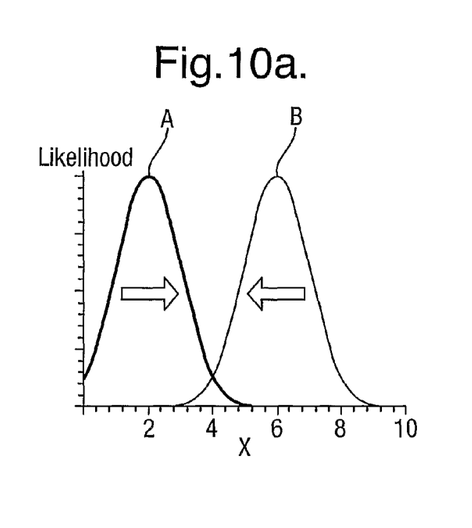
FIGS. 10a-10d show curves representing the respective likelihood function associated with first and second objects before, during, and after an occlusion event.
Figure 10B:
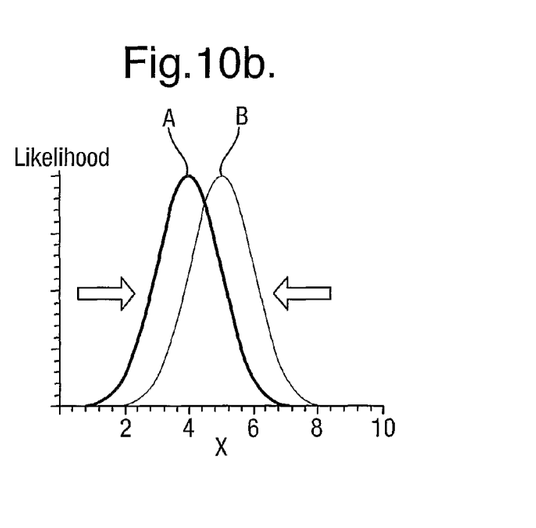
Figure 10C:
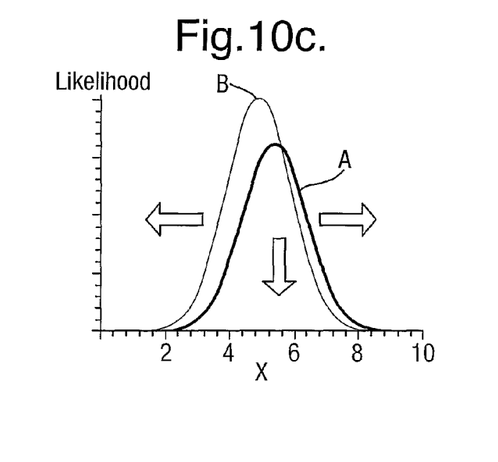
Figure 10D:
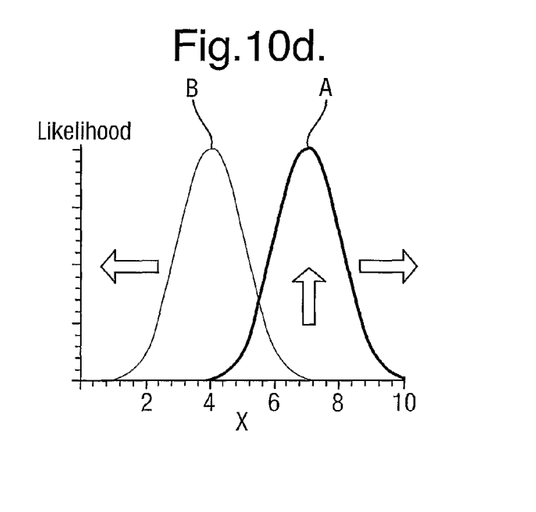
Figure 12A:
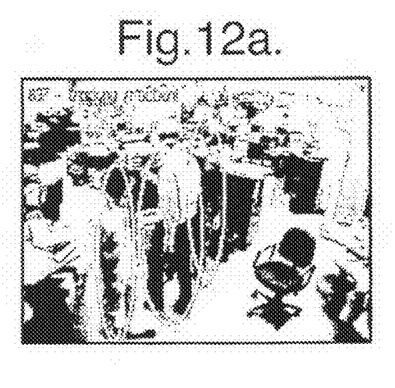
FIGS. 12(a) and 12(b) respectively represent a captured video frame comprising a number of foreground objects, and a horizon line indicating the view field of the video frame.
Figure 12B:
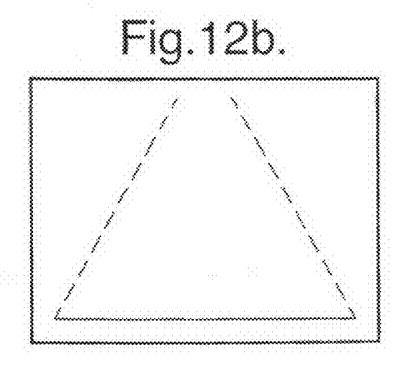

In the top-down approach, it is observed that in indoor surveillance situations, video frames usually show a frontal oblique view of the monitored scene on a ground plane. It is reasonable to assume, therefore, that the relative depth of an object is related to the location of its contact point on the ground. The lower the contact point of an object, the closer that object is to the camera. An example is shown in FIG. 12(a) which shows three objects in an office scene, each object being characterised by a respective fitting ellipse having a base point indicated by an 'x'. By identifying the order of base points from the bottom of the image, the depth order can be estimated. FIG. 10(b) shows the 'visible line' inside the image which is parallel to, and indicative of, the perspective horizon line of the scene.

Figure 11:
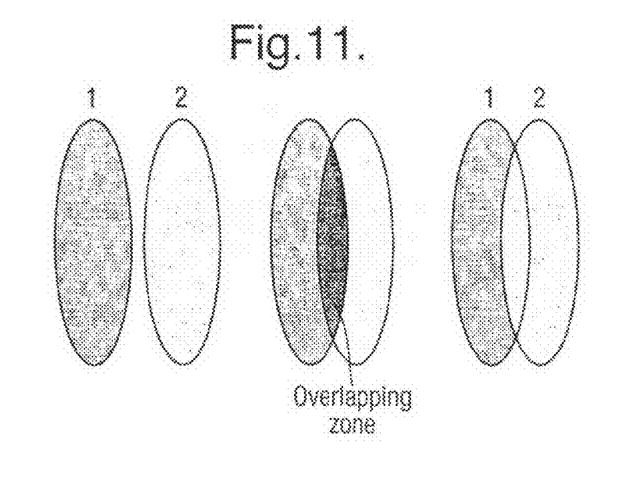
FIG. 11 is a schematic diagram which is useful for understanding a first method of estimating the depth order of a plurality of objects during an occlusion event.
Figure 13A:
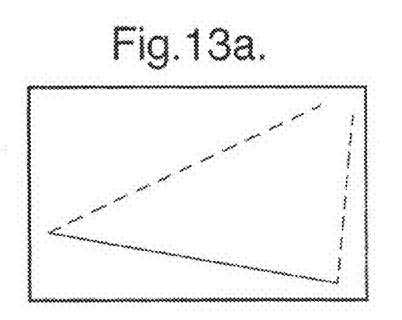
FIGS. 13(a)-13(d) represent different horizon line orientations indicative of the view field of respective video frames.
Figure 13B:
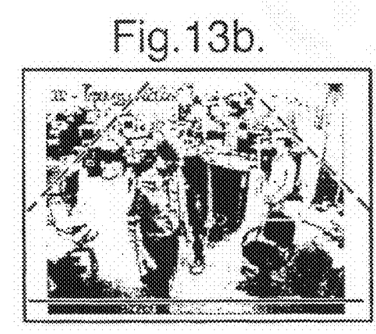
Figure 13C:
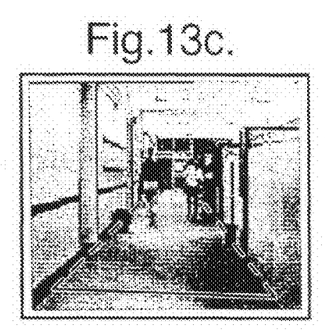
Figure 13D:
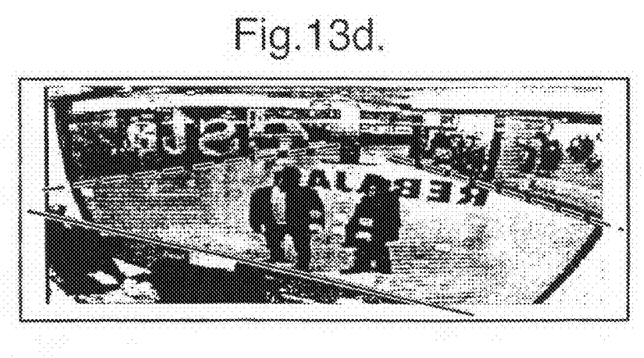

In situations where the camera does not provide a front oblique view, the method can be applied by manually entering the perspective horizon line, as indicated in FIG. 13(a). In this case, depth ordering is obtained by comparing the distance of each object's base point from the horizon line. FIGS. 13(b) to 11(d) show the perspective scene geometry of some exemplary indoor sequences. In each case, the horizon line is represented by a line equation y=mx that passes through the origin of the coordinates set at the bottom-left corner of the image. The perpendicular distance of each object's contact point from the horizon line is used to determine the relative depth ordering of the objects.

The top-down approach is simple and effective, although the assumption has been made that the contact points of the constituent objects are visible in the image. In the event that the contact point of an object on the ground plane is not visible, e.g. because it is partially occluded by static or moving objects, or simply out of camera shot, this estimation may not be sufficient. Accordingly, the top-down approach is preferably verified by a bottom-up approach to depth ordering that uses the number of pixels assigned to each constituent object from pixel-level segmentation results obtained over a number of previously-received frames. By analysing the change in the number of pixels assigned to each model over this time period, which tends to decrease during occlusion for those with greater depth (since they are becoming more and more occluded) it is possible to validate or question the initial depth order provided by the top-down approach.

To summarise, there has been described an intelligent video surveillance system 10 which includes a new matching process stage 41 capable of robust tracking over a range of complex scenarios. In particular, the matching process stage 4 is arranged to detect commencement of an occlusion event and to perform group segmentation on the resulting grouped blob thereby to maintain the identities of individual objects being tracked. In this way, it is possible to continuously track objects before, during and after an occlusion event. Blob-based tracking ensures that any sudden change in an object's appearance will not affect the matching process, whilst also being computationally efficient. Segmentation is performed using a pre-generated appearance model for each individual blob of the grouped blob, together with the newly-defined SDAM parameter accounting for the spatial location of each pixel and the relative depth of the object to which the pixel belongs. The relative depth information can be obtained using a number of methods, the preferred method utilising a top-down scene geometry approach with a bottom-up verification step.

The invention claimed is:

1. A method of tracking objects in a video sequence comprising a plurality of frames, each object being defined by a plurality of pixels, the method comprising:
   (a) identifying, in a first frame, first and second objects;
   (b) providing first and second appearance models respectively representing the first and second objects;
   (c) identifying in a second, subsequent, frame, a group object resulting from the merging of the first and second objects due to occlusion;
   (d) classifying each pixel of the group object as representing either the first or second object, the classification comprising
      (i) calculating first and second likelihood parameters respectively indicating the correspondence between said pixel's appearance and the first and second appearance models,
      (ii) applying a first and second weighting factor to the respective likelihood parameters, said weighting factors being respectively based on and indicative of the determined depth order of the first and second objects, and
      (iii) identifying which of the first and second objects said pixel represents on the basis of the weighted first and second likelihood parameters;

wherein the depth order of the first and second objects is determined based on determining in the first frame which of the first and second objects is nearer to a reference position in the first frame or nearer to a reference line extending across the first frame.

2. A method according to claim 1, wherein the object nearest the reference position or the reference line is assigned to a first level and the other object is assigned to a second level.

3. A method according to claim 2, wherein the depth order is verified by analysing the change in the number of pixels defining the respective first and second objects over a plurality of frames generated prior to the second frame, the depth order of the objects being interchanged if the number of pixels defining object assigned to the first level has the greatest change in number of pixels.

4. A method according to claim 1, wherein the first and second appearance models represent the respective colour distribution of the first and second candidate objects.

5. A method according to claim 1, wherein the first and second appearance models represent a combination of the respective (a) colour distribution of, and (b) edge density information for, the first and second candidate objects.

6. A method according to claim 5, wherein the edge density information is derived from a Sobel edge detection operation performed on the candidate object.

7. A method according to claim 1, wherein step (c) comprises identifying a new candidate object whose frame position partially overlaps the respective frame positions of the first and second candidate objects identified in (a).

8. A method according to claim 1, wherein step (c) comprises identifying that the number of candidate objects in the second frame is less than the number of candidate objects identified in the first frame, and identifying a new candidate object whose frame position partially overlaps the respective frame positions of the first and second candidate objects identified in (a).

9. A non-transitory computer readable medium having stored therein a computer program comprising instructions which, when executed on a processor, perform the steps of claim 1.

10. An image processing system comprising:
   a receiver arranged to receive a sequence of frames from a video source; and
   a processor arranged to:
      (a) identify, in a first frame, first and second objects,
      (b) provide first and second appearance models respectively representing the first and second models;
      (c) identify, in a second, subsequent frame, a group object resulting from the merging of the first and second objects due to occlusion,
      (d) classify each pixel of the group object as representing either the first or second object, the classification comprising:
         (i) calculating first and second likelihood parameters respectively indicating correspondence between said pixel's appearance and the first and second appearance models;
         (ii) applying a first and second weighting factor to the respective likelihood parameters, said weighting factor being respectively based on and indicative of the determined depth order of the first and second objects; and
         (iii) identifying which of the first and second objects said pixel represents on the basis of the weighted first and second likelihood parameters;
      wherein the depth order of the first and second objects is determined based on determining in said first frame which of the first and second objects is nearer to a reference position in the first frame or to a reference line extending across the first frame.

11. A video surveillance system comprising a video source for generating frames of a video sequence and an image processing system according to claim 10.

* * * * *